HALF-CYCLE RINGING CIRCUIT

Filed May 28, 1962

INVENTOR.
HOWARD H. HILL
BY Robert J. Schiller
ATTORNEYS 3,170,074

HALF-CYCLE RINGING CIRCUIT

Howard H. Hill, Northboro, Mass., assignor to Computer Control Company, Inc., Framingham, Mass., a corporation of Delaware Filed May 28, 1962, Ser. No. 198,259
7 Claims. (Cl. 307—88.5)

This invention relates to electronic apparatus, and more particularly to driver circuitry for an input transducer of a delay line for serial data storage.

It is known that certain materials, such as elongated glass, quartz, or metal elements can be used for acoustic delay lines. Particularly, it is advantageous, when using such delay lines for high-speed digital data storage, to operate the lines in the return-to-zero (RZ) mode. In the RZ mode, the presence of a pulse at a discrete point of time represents, for instance, a binary ONE: the absence of a pulse at a discrete point of time represents then a binary ZERO. The discrete points in time at which a pulse or lack thereof is significant are determined usually by a synchronous clock-pulse train which may also govern the entire system of which the input drive circuit and delay line are part. The binary data are stored in the delay line in the form of a serial pulse train exactly positioned and modulated.

Usually, these delay lines employ, as input and output transducers, electromechanical elements, such as quartz crystals, mechanically adjusted to provide appropriate frequency and band-width characteristics. However, such transducers possess undesirably high values of shunt capacitance. A circuit for driving such transducer need accurately shape, modulate and time pulses which address the transducer. A preferred pulse shape to the delay line approximates "gaussian" form, as realized in a half-cycle cosine pulse, since the frequency spectrum of the pulse is then narrow and results in improving, from a signal-to-noise consideration, the carriage of information within a limited band-width. The transfer to the delay line will cause the input pulse to be differentiated and the differentiated input pulse will be again differentiated at the output transducer of the line. This provides a tripolar output wave-form having one pulse in one polarity and two pulses of opposite polarity. By clipping or limiting, the datum represented by the one pulse is then reconstituted. Obviously, if more than a single pole pulse of predetermined minimum amplitude is introduced into the input transducer, the double differentiation process of the delay line creates a plurality of both polarities of pulses, and reconstruction of the input data becomes complicated.

It is therefore a principal object of the present invention to provide an input circuit for driving with unit RZ pulses, an acoustic delay line transducer, which circuit is capable of accurately shaping the input pulse and driving this pulse with excellent fidelity into a transducer of shunt capacitance which is relatively high with respect to the pulse width and frequency.

Other objects of the present invention are to provide an input driver circuit of the type described in which the shunt capacitance of the input transducer is used as part of a low-Q ringing circuit, which circuit includes means for limiting the ringing of the circuit to one-half cycle in order to produce the desired input pulse; to provide an input driver circuit of the type described wherein the circuit includes a common-emitter transistor amplifier operating in its non-saturated current mode, the low-Q ringing circuit being the load on the transistor collector, and wherein the means for limiting the ringing comprises a unilateral current conducting device coupled in series with a capacitance in the transistor emitter-collector circuit; and to provide a pulse generator operable in an RZ mode capable of providing a gated one-half cycle output without appreciable overshoot or ringing delay.

These and other objects of the present invention will in part be obvious and will in part appear hereinafter. The invention accordingly comprises the apparatus possessing the construction, combination of elements and arrangement of parts which are exemplified in the following detailed disclosure and the scope of the application of which will be indicated in the claims.

For a fuller understanding of the nature and objects of this invention, reference should be had to the following detailed description taken in connection with the accompanying drawing in which.

Figure 1:
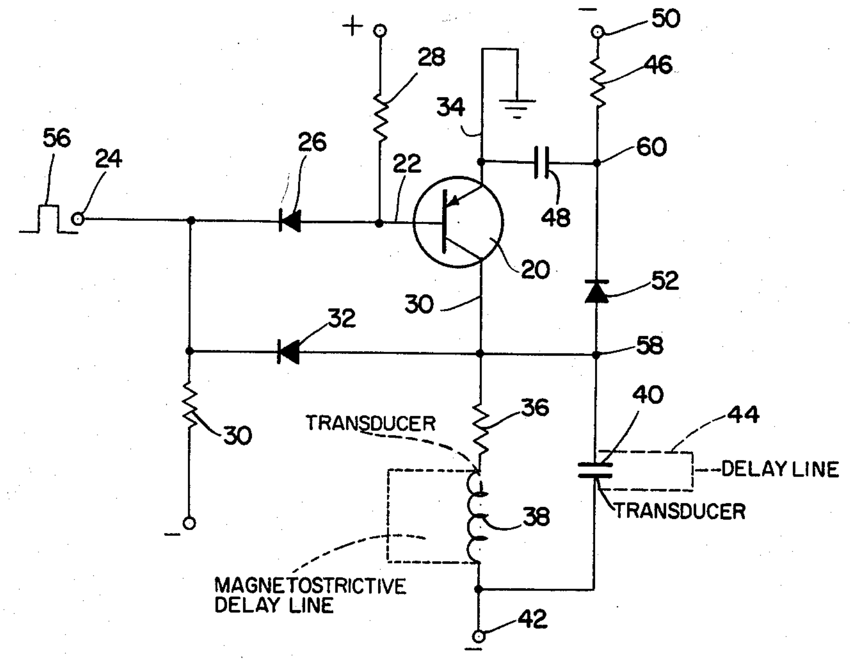
FIG. 1 is a circuit diagram of one embodiment of the present invention.

Referring now to FIG. 1 there will be seen an exemplary embodiment of the present invention comprising transistor 20, the base 22 of which is coupled to input terminal 24 through diode 26. With a pnp type transistor as shown, diode 26 is poled so that its anode is directed toward the transistor base, diode 26 preferably being a high drop, low speed silicon diode of the "stabistor" class. As a means for providing bias current to the base, a source of positive potential is connected through resistor 28 to a tap in the diode-transistor base circuit, a source of negative potential being connected through another resistor 30 to the cathode of diode 26. A collector-to-base feedback circuit is provided by connecting transistor-collector 30 through second diode 32 to the cathode of diode 26, the cathodes of both diode 26 and diode 32 being in face-to-face relation. Diode 32 is preferably a very high speed, germanium diode exhibiting high speed and low voltage drop. Emitter 34 of transistor 20 is grounded. It will be seen that the circuit thus far described is a common-emitter circuit configuration which provides high power gain, and is similar to double-diode clamped switching circuits well known in the art such as the circuits shown in FIG. 10.11(C) on page 99 of The General Electric Transistor Manual, 5th edition, published 1960 by The General Electric Company.

The load in the collector circuit of the transistor is a low-Q ringing circuit or tank comprising series resistor 36 and inductor 38 in parallel with a crystal transducer shown as capacitor 40, the ringing circuit being connected between collector 30 and a negative potential at terminal 42. The crystal transducer represented by capacitor 40 is the input transducer of an acoustic delay line of known type, indicated by the broken lines at 44.

The invention further comprises an RC integrating network comprising resistor 46 connected in series with capacitance 48 between a source of negative potential at terminal 50 and ground, as by connection of capacitance 48 with emitter 34. The RC network is coupled to the ringing circuit through diode 52, the latter being poled so that the diode cathode is connected intermediate resistor 46 and capacitor 48 and the anode is connected to the ringing circuit as by coupling directly to transistor collector 30.

In operation the switching circuit preferably operates in the current mode as an unsaturated switch, i.e., the collector and emitter junctions are not both forward biased. This provides excellent switching speeds for minimum delay. Sufficient current is provided through resistor 30 to keep transistor 20 in its "on" state. The current then appearing through resistor 28 provides a stable base current through diode 26 irrespective of D.C. gain changes in transistor 20. By providing appropriate diodes 26 and 32 in the form heretofore described, it will be seen that when diode 32 shunts sufficient collector current to diode 26 to offset excessive current through resistor 30, transistor 20 can be held "on" at the edge of saturation in Class A operation. By providing sources of positive potential to resistor 28 and negative potential to resistor 30 at respectively 12 volts, resistor 28 being about 6.2K ohms and resistor 30 being about 750 ohms, the collector voltage is typically —0.8 volt with a 2N966 transistor under these conditions.

When transistor 20 is normally "on," current will flow through resistor 36 and inductor 38, the magnitude of current being determined, of course, by the value of resistor 36 and the regulated collector voltage. As a result of this collector current from transistor 20, energy is stored in inductor 38. The electrokinetic energy stored is determined by the magnitudes of the inductance (L) of inductor 38 and the current (I) flowing through resistor 36 according to the well-known relation $$w=\frac{I^2L}{2}$$

Typically, the capacitance of capacitor 40 is around 50 to 65 picofarads; to provide proper ringing, resistor 36 is then approximately 43 ohms, inductor 38 is about 0.68 microhenry, the charging current being approximately 70 milliamps while terminal 42 is maintained at a potential of about —4 volts.

In order to operate the portion of the circuit thus described to actuate the delay line, a clocked current pulse 56 of positive polarity and of peak magnitude equal to or greater than the base bias current is applied to terminal 24. This clock current pulse, for instance, may be derived from known devices, as for instance a common-base pulse gate transistor. The pulse applied to terminal 24, because of its sharply rising leading edge, rapidly bucks out the bias base current of transistor 20, turning the latter "off." Since transistor 20 was not saturated and is preferably a very high speed, low storage transistor, the flow of collector current ceases almost instantaneously upon application of the input pulse 56.

Upon cessation of the collector current, inductor 38 begins to release its stored energy to capacitor 40. Hence, junction 58 between capacitor 40 and resistor 36 begins a negative voltage excursion which peaks or terminates in the transfer from inductor 38 to capacitor 40 of the stored energy less any IR loss in resistor 36. The process will continue by reversal inasmuch as the energy now stored in capacitor 40 will transfer back toward inductor 38 causing junction 58 to swing toward a less-negative potential; if unimpeded the process will continue until a series of exponentially decaying alternating pulses are provided. Resonant or ringing circuits which employ the capacitance of the crystal transducer to obtain resonance, are known and described in such prior art as U.S. Patents 2,963,680, Beebe; 2,852,676, Joy; 2,416,237, Mason, and others. However, all of these circuits provide a plurality of alternating pulses which, as heretofore, are undesirable in the transmission and storage of binary data in RZ form through a delay line.

However, the present invention further includes the RC network heretofore described, as an anti-ringing circuit which functions to reduce the Q of the pulse-forming circuit at the end of one-half cycle to a point at which further ringing is no longer possible. Assuming that no input pulse has been gated to terminal 24, transistor 20 being "on" is conducting so that junction 58 is held at the collector potential, for instance, of —0.8 volt as heretofore described. However, with proper choice of value for resistor 46, diode 52 is forwardly biased and therefore conducts, holding junction 60 of resistor 46 and capacitor 48 at a predetermined voltage below ground, for instance, about —0.9 volt. Thus resistor 46 appears as a load to transistor 20.

Figure 2:
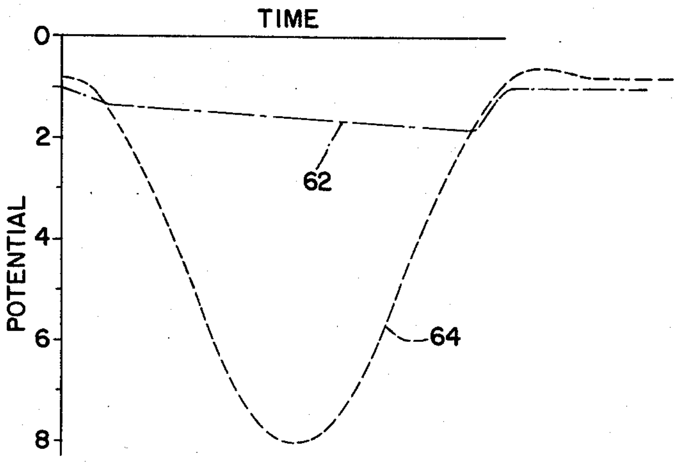
FIG. 2 is a graphical time amplitude representation of wave-forms at various points therein during operation.

Now, when pulse 56 turns transistor 20 "off," junction 58 is forced to ring negatively. Due to the integrating action of capacitor 48, the potential at junction 60 cannot change as rapidly as the voltage at junction 58 but does begin to move more negatively, as shown on waveform 62 of FIG. 2, at a rate set by the RC time constant of the network. Consequently, junction 58, falling faster than junction 60, quickly reaches a level at which it is more negative than the latter; diode 52, being then reverse biased, stops conducting. As junction 58 goes more negative it forms the first portion of the cosine wave-form shown at 64 in FIG. 2. Wave-form 64 reaches the peak of its excursion and starts to go in a less-negative direction, due to the reversal of energy distribution in the low-Q ringing circuit. However, because diode 52 in its non-conductive state isolates junction 58 from junction 60, the potential at the latter still continues to decay negatively. The voltage excursion of junction 58 in its less-negative direction continues, finally arriving at a point where junction 58 is positive with respect to junction 60, forward biasing diode 52 again.

Diode 52, which is preferably a high speed element, therefore resumes conduction just before the half-cycle ringing of the tank is completed, this point being set by the timing provided by the RC circuit. The values of the circuit elements are so selected that, for instance, the excursion of wave-form 64 is about to a —8 volt level, and during the time required for almost a complete half-cycle of wave-form 64, the potential at junction 60 decays only about —1 volt. When diode 52 resumes conduction, it again connects resistor 46 and capacitor 48 across the tank; the remaining energy in the latter is therefore dumped into capacitor 48 and any tendency for the tank to continue ringing into another half-cycle is damped. Because there is a finite rise time in the initial conduction of diode 52 when the latter is again forward biased, there is normally a tendency to overshoot. For instance, if diode 52 were alone in the emitter-collector circuit, the ringing of the resonant tank would be damped but with a substantial amount of overshoot due to the diode rise-time and forward drop. However, in the invention, due to the voltage decay provided by the integrating operation of the network, forward biasing of the diode is timed to occur before the wave-form of the tank oscillation has returned to its base line at the initial collector voltage. Hence, the rise time of diode conduction occurs during the half-cycle of tank oscillation and full damping is accomplished.

Wave-form 64, appearing across the crystal, provides pulse transmission into delay line 44 of a single spike pulse with minute, if any overshoot. Upon termination of pulse 56, the base bias to transistor 20 is restored and the latter conducts, re-energizing inductor 38 for the next input pulse to terminal 24.

The Q of the resonant circuit is considered low because of the presence of resistor 36. And since the duty cycle of the circuit of the invention is less than 33% even at pulse repetition rates as high as 16 megapulses per second (e.g., 20-nanosecond pulses at each 62.5 nanoseconds) resistor 36 must have sufficiently high value to allow complete restoration of energy in the resonant circuit between pulses. Thus, the circuit is quite free from output amplitude variations normally caused by duty cycle changes which plague serial digital systems. The driving circuit of the invention is particularly efficient in driving high-speed data pulses into relatively large transducer capacitances at very high data rates. Through use of such circuit, an economy of parts is achieved. Further, the gain bandwidth and power handling requirements of the driver transistor are considerably reduced to practical values, resulting in power economy. Circuit reliability is assured because the amplitude and width of the pulse introduced to the delay line are primarily set by passive, stable circuit elements and not by active gain elements, such as transistors in forward conduction.

Although the circuit of the invention has been described in connection with a pnp transistor, it will be seen that a npn transistor may also be used with appropriate alterations with respect to the polarities involved in the circuit. The circuit is also adaptable for use with magnetostrictive or such delay line input transducers as exhibit primarily inductive reactance instead of capacitance, merely by considering inductor 38 as the transducer as shown in dotted lines in FIG. 1 and adjusting the values of resistor 36 and capacitor 40 to tune the tank accordingly.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Electrical apparatus for driving an acoustic delay line transducer responsively to an input pulse, said apparatus comprising, in combination:
   a ringing circuit including the reactance of said transducer as an element thereof;
   a resistance-capacitance integrating network having a long time constant relative to the periodicity of said ringing circuit;
   unilateral conductive means connected between said ringing circuit and said network;
   means connected to said circuit and said network for so normally energizing said circuit at a first potential and for so normally energizing said network at a second potential that said potentials forward bias said conductive means into conduction for electrically coupling said circuit and said network;
   said means being responsive to said pulse for initiating in said circuit an oscillatory wave train having in its first one-half cycle an initial voltage change from said first potential in a given direction at a predetermined rate and for initiating in said network a voltage change from said second potential in said given direction at a lesser rate so that said changes first reverse bias said unilateral conductive means for decoupling said circuit and said network, and during the latter part of said half cycle wherein the direction of the subsequent voltage change therein is reversed said subsequent voltage change and the voltage change in said network again forward bias said unilateral conductive means for recoupling said circuit and said network, thereby effectively damping said oscillatory wave train to substantially within said half cycle.

2. An electrical apparatus as defined in claim 1 wherein said unilateral conductive means is a diode having one pole thereof connected to said ringing circuit and the other pole thereof connected between the resistance and the capacitance of said network.

3. An electrical apparatus as defined in claim 1 further comprising:
   a normally conducting transistor switching amplifier; and
   wherein said ringing circuit connected at one end to terminal means for connection to a first source of operating potential and at its other end to said amplifier and including a parallel inductor and capacitor, one of which primarily constitutes the reactance of said transducer and the other of which is in series with a resistor, said resonant circuit being actuatable to ring into oscillation by said amplifier when one of said pulses is inserted in the input to the latter.

4. An electrical apparatus as defined in claim 3 including means for normally biasing said amplifier on, said amplifier being actuatable to switch off responsively to introduction of one of said pulses to the input of said amplifier, said resonant circuit being actuatable into said oscillation responsively to the switching off of said amplifier.

5. An electrical apparatus as defined in claim 4 wherein said amplifier, when in "on" condition, constitutes means for forward biasing said unilateral conductive means for conductively coupling said resonant circuit and said integrating network, said means being reversely biased by the relative changes in potentials of said resonant circuit and said integrating network just following switching of said amplifier to "off," and then being forwardly biased again by the relative changes in said potentials just before completion of the first half cycle of said oscillation.

6. An electronic apparatus for driving with return-to-zero pulses an acoustic delay line transducer having shunt capacitance, said apparatus comprising in combination:
   an unsaturated unit transistor switching amplifier normally base biased into conduction and being actuatable to a non-conduction state by application of one of said pulses to said base;
   a resonant ringing circuit including said capacitance in parallel with a series inductor and resistor, and being connected between a first source of potential and one of the collector and emitter terminals of said transistor; said resonant circuit being actuable to oscillate by the change of said amplifier from its conductive to its non-conductive state;
   a second resistor and second capacitor in series forming an integrating network, said second resistor being connected to a second source of potential and said second capacitor being connected to the other of said collector and emitter terminals;
   a diode for coupling said circuit and said network, and being connected between said second resistor and second capacitance to said one of said collector and emitter terminals, the values of said resistors, capacitances, inductor and potentials being selected for forward biasing said diode during conduction of said amplifier, for reverse biasing said diode just after said amplifier is actuated to said non-conductive state, and for again forward biasing said diode just before the end of the first half cycle of said oscillation of said resonant circuit.

7. An electronic apparatus for driving with return-to-zero pulses an acoustic delay line transducer having shunt inductance, said apparatus comprising in combination:
   an unsaturated unit transistor switching amplifier normally base biased into conduction and being actuatable to a non-conduction state by application of one of said pulses to said base;
   a resonant ringing circuit including said inductance in series with a resistor, both being in parallel with said capacitor, and being connected between a first source of potential and one of the collector and emitter terminals of said transistor; said resonant circuit being actuable to oscillate by the change of said amplifier from its conductive to its non-conductive state;
   a second resistor and second capacitor in series forming an integrating network, said second resistor being connected to a second source of potential and said second capacitor being connected to the other of said collector and emitter terminals;
   a diode for coupling said circuit and said network, and being connected between said second resistor and second capacitance to said one of said collector and emitter terminals, the values of said resistors, capacitances, inductor and potentials being selected for forward biasing said diode during conduction of said amplifier, for reverse biasing said diode just after said amplifier is actuated to said non-conductive state, and for again forward biasing said diode just before the end of the first half cycle of said oscillation of said resonant circuit.

References Cited by the Examiner

UNITED STATES PATENTS 3,041,470 6/62 Woodworth ------------ 328—35

DAVID J. GALVIN, *Primary Examiner.*